(No Model.)

D. L. MITCHELL.
INDICATOR DIAL.

No. 376,103.   Patented Jan. 10, 1888.

Witnesses:
Walter E. Lombard.
Alvin P. Johnson.

Inventor:
Daniel L. Mitchell,
by N. C. Lombard
Attorney.

UNITED STATES PATENT OFFICE.

DANIEL L. MITCHELL, OF TAUNTON, MASSACHUSETTS.

INDICATOR-DIAL.

SPECIFICATION forming part of Letters Patent No. 376,103, dated January 10, 1888.

Application filed April 11, 1887. Serial No. 234,330. (No model.)

*To all whom it may concern:*

Be it known that I, DANIEL L. MITCHELL, of Taunton, in the county of Bristol and State of Massachusetts, have invented a new and useful Improvement in Sight Signals and Indicators, of which the following, taken in connection with the accompanying drawings, is a specification.

The object of my invention is the production of a sight signal or indicator which may be readily seen at a considerable distance, and that will at a glance convey to the mind of the party interested the condition of the apparatus to which it is applied as to whether it is safe or dangerous or above or below the normal or regular working-point of same. It is equally applicable to steam-gages, thermometers, voltmeters, ammeters, telemeters, railway-signals, and pressure-gages of every description.

It consists in the use of a field or dial having its face painted or otherwise made in two strongly-contrasting colors—as white and black or red and white—divided on the line or at the point of normal working or desired pressure, in combination with the index or pointer arranged to move over said field or dial, and having its outer face painted or otherwise made in the same two strongly-contrasting colors, all so constructed and arranged that when the index or pointer is thrown by the current or pressure upon that portion of the field or dial that is white the index or pointer will instantly show black on the white ground, and when the index or pointer is thrown or remains upon the darker side of the field or dial the index or pointer shows white on the dark field.

Figure 1:
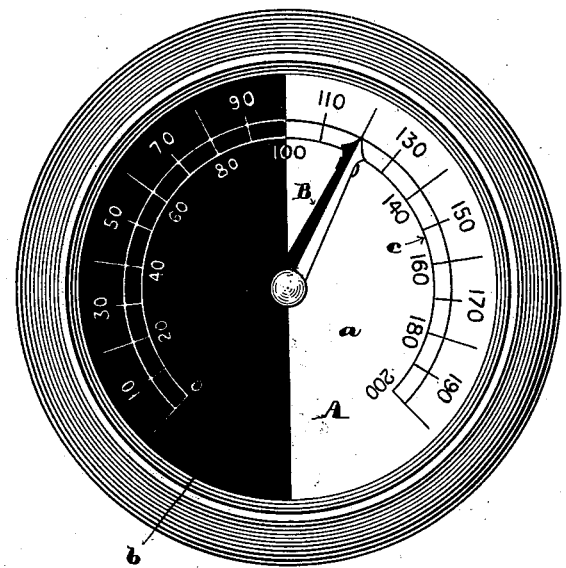
Figure 2:
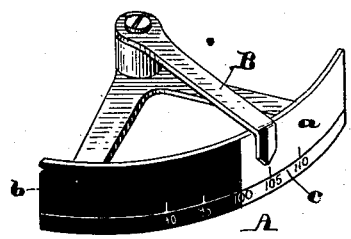

In the drawings, Figure 1 represents a front elevation of a steam-gage with my invention applied thereto; and Fig. 2 represents a perspective view of a voltmeter illustrating my invention.

In each of the illustrations, A is the field or dial, one half, *a*, of which is painted or otherwise made a clear white, and the other half, *b*, is in like manner made a jet black; or, if preferred, it may be made a bright red or any other desirable color contrasting strongly with the white upon the other portion of the field.

In applying my invention to a steam-gage the line of separation between the different-colored portions of the dial should pass through the division on the gage-face that indicates the pressure above which it is not desired to carry steam in the boiler. The white field in the drawings is on the "danger" side and the black field is on the "safety" side, and when the index shows white on the black field the engineer or fireman knows that the pressure of steam in the boiler is within the "safety" limits; but if the index shows black on the white field he knows that the steam in the boiler has passed beyond the limits of safety, and that danger may be apprehended if not attended to at once. The same may be said of the voltmeter shown in Fig. 2, indicating the normal or working tension of the electric current in a lighting circuit or system, where one hundred volts may be the point of efficiency and safety, the application of my invention showing instantly any variation above or below the required point.

It is obvious that the colors may be reversed or any other combination used that may be desired.

B is the index or pointer, which may be made of any desired shape, according to the purpose for which it is to be used.

The operation of my invention will be readily understood from the foregoing without further description here.

What I claim as new, and desire to secure by Letters Patent of the United States, is—

1. A sight signal or indicator having a field or dial the face of which is painted or otherwise made in two strongly-contrasting colors, with a clearly-defined dividing-line at any desired point, in combination with an index-finger or pointer arranged to move over said field or dial, and having its outer face painted or otherwise made in the same two strongly-contrasting colors.

2. A sight signal or indicator having a field or dial the face of which is painted or otherwise made in two strongly-contrasting colors, one of which represents the "safety" field and the other the "danger" field, in combination with an index or pointer arranged to be moved over said "safety" and "danger" fields, and having its outer face painted or otherwise made in the same two strongly-contrasting colors, the division between said colors extending longitudinally and centrally thereof.

In testimony whereof I have signed my name to this specification, in the presence of two subscribing witnesses, on this 6th day of April, A. D. 1887.

DANIEL L. MITCHELL.

Witnesses:
N. C. LOMBARD,
WALTER E. LOMBARD.